United States Patent
Nix et al.

(10) Patent No.: US 7,397,812 B2
(45) Date of Patent: Jul. 8, 2008

(54) SYSTEM AND METHOD FOR WIRELESS BROADCAST OF MULTIMEDIA FILES TO VEHICLES

(75) Inventors: Axel Nix, Birmingham, MI (US); Robert M. Riley, Jr., Novi, MI (US)

(73) Assignee: General Motors Corporation, Detroit, MI (US)

( * ) Notice: Subject to any disclaimer, the term of this patent is extended or adjusted under 35 U.S.C. 154(b) by 710 days.

(21) Appl. No.: 10/930,427

(22) Filed: Aug. 31, 2004

(65) Prior Publication Data

US 2006/0045015 A1 Mar. 2, 2006

(51) Int. Cl.
*H04J 3/26* (2006.01)
(52) U.S. Cl. .............. 370/432; 455/3.01; 455/569.2
(58) Field of Classification Search ........... 370/432; 455/3.01, 569.2; 342/359; 340/901; 709/245; 375/216; 705/13
See application file for complete search history.

(56) References Cited

U.S. PATENT DOCUMENTS

| | | | | | |
|---|---|---|---|---|---|
| 5,628,015 | A | * | 5/1997 | Singh | 726/32 |
| 6,407,673 | B1 | * | 6/2002 | Lane | 340/901 |
| 6,441,782 | B2 | * | 8/2002 | Kelly et al. | 342/359 |
| 6,741,834 | B1 | * | 5/2004 | Godwin | 455/3.01 |
| 6,839,770 | B1 | * | 1/2005 | Dillon | 709/245 |
| 7,139,595 | B2 | * | 11/2006 | Lane | 455/562.2 |
| 2002/0141491 | A1 | * | 10/2002 | Corts et al. | 375/216 |
| 2003/0206554 | A1 | * | 11/2003 | Dillon | 370/432 |
| 2005/0256762 | A1 | * | 11/2005 | Dar et al. | 705/13 |

* cited by examiner

*Primary Examiner*—Chi Pham
*Assistant Examiner*—Albert T. Chou

(57) ABSTRACT

Apparatus and methods are provided for wirelessly broadcasting large multimedia files to vehicles. The apparatus includes a vehicle-based receiver configured to wirelessly receive at least one group of encoded data packets at a data rate based on a number of concurrently broadcasted groups of encoded data packets, a decoder coupled to the data storage device, a data storage device coupled to the receiver, and a media playback unit coupled to the data storage device. The group of data packets corresponds to at least a portion of a multimedia content, and each of the data packets contains at least a portion of the multimedia content. The data rate is based on an average vehicle operation duration and/or a probability of occurrence of the average vehicle operation duration. The decoder is configured to assemble at least a portion of the multimedia content from the first data file upon the data storage device receiving a pre-determined number of data packets. The data storage device is configured to store the group of data packets and assembled multimedia content. The playback unit is configured to play the assembled multimedia content.

18 Claims, 5 Drawing Sheets

SYSTEM AND METHOD FOR WIRELESS BROADCAST OF MULTIMEDIA FILES TO VEHICLES

TECHNICAL FIELD

The present invention generally relates to multimedia broadcast systems, and more particularly relates to wireless broadcast of large multimedia data to vehicles.

BACKGROUND

Vehicle operators tend to spend a significant amount of time in their respective vehicles particularly when commuting from a home to a workplace, running errands, conducting business, vacationing, or for many other reasons. This time is significant enough that some vehicles come equipped with a variety of consumer electronics such as compact disc (CD) players, cassette tape players, radios, satellite radios, electronic gaming, and digital video disc (DVD) players. Some owners may also choose to equip their vehicle with aftermarket consumer electronics in the event their vehicles lack such consumer electronics or for purposes of customization. These and other entertainment or infotainment electronic devices provide a passenger in the vehicle with time-occupying options and may improve the passenger's quality of time.

Consumer electronics such as CD players, cassette tape players, DVD players, and electronic gaming generally have related media content for playback residing on a localized storage medium. For example, many on-board navigation systems utilize geographic information stored on CD's. This information may be downloaded to a memory associated with the navigation system, located in the vehicle, or directly accessed from the CD by the navigation system. In another example, DVD players commonly play media that is stored on DVD.

Consumer electronics such as radios, satellite radios, and cellular phones generally have related media content transmitted in real-time. For example, satellite radios receive audio broadcasts carried in a selected frequency band and play such broadcasts when the satellite radio is activated. In general, these forms of consumer electronics use transmission methods that may have limited types of transmitted media and reception modes.

Accordingly, it is desirable to provide a system for wireless broadcast of relatively large and multiple types of multimedia data to vehicles. In addition, it is desirable to provide a multimedia system for a vehicle that is capable of receiving large multimedia data during intermittent operation of the vehicle. Furthermore, other desirable features and characteristics of the present invention will become apparent from the subsequent detailed description of the invention and the appended claims, taken in conjunction with the accompanying drawings and this background of the invention.

BRIEF SUMMARY

According to various exemplary embodiments, a system is provided for wirelessly broadcasting large multimedia files to vehicles. In a first exemplary embodiment, a system for broadcasting multimedia files to vehicles is provided that includes an encoder configured to convert a multimedia file to a group of encoded data packets; and a wireless transmitter coupled to the encoder. The transmitter is configured to receive the group of encoded data packets from the encoder and concurrently broadcast at least one group of encoded data packets for a pre-determined time period and at a pre-determined data rate. Each of the groups of encoded data packets correspond to a different multimedia file. The time period is based on an average vehicle operation duration, and the data rate based on a broadcast bandwidth and a number of concurrently broadcasted groups of encoded data packets.

In a second exemplary embodiment, a multimedia system for a vehicle is provided that includes a vehicle-based receiver configured to wirelessly receive at least one group of encoded multimedia data packets during activation of the vehicle, a data storage device coupled to the receiver, a decoder coupled to the data storage device, and a multimedia playback device coupled to the data storage device. The groups of encoded multimedia data packets are broadcasted at a pre-determined data rate for a pre-determined time period. Each of the groups of encoded multimedia data packets correspond to a different multimedia data file. The data rate is based on a broadcast bandwidth and a number of concurrently broadcasted groups of encoded data packets, and the time period is based on an average vehicle operation duration. The data storage device is configured to store the groups of encoded multimedia data packets and assembled multimedia data files. The decoder is configured to access the groups of encoded multimedia data packets from the data storage device and assemble the different multimedia data files upon receiving a threshold number of encoded multimedia data packets for the groups of encoded multimedia data packets. The playback device is configured to play the assembled multimedia data files.

In a third exemplary embodiment, a method of broadcasting multimedia files to vehicles is provided having the steps of generating a group of encoded data packets from a multimedia file containing to a multimedia content, and wirelessly and concurrently transmitting at least one group of encoded data packets for a time period based on an average vehicle operation duration and a data rate based on a number of concurrent broadcasts of groups of encoded data packets.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

The present invention is a system for wireless broadcast of multimedia to vehicles. Most vehicles tend to be intermittently operated. Vehicles may be operated for various lengths of time and for various purposes. For example, passenger vehicles may be used for transportation from home and a workplace, between work sites, and along any number of different routes among different places. The invented system provides a transmission of multimedia files that accounts for the varying time periods of vehicle operation.

As used herein, the term "file" refers to any data that is stored at one or more sources and is to be delivered as a unit to one or more destinations. For example, a document, an image, and a file from a file server or computer storage device, are all examples of "files" that may be delivered. Files can be of known size (such as a one megabyte image stored on a hard disk) or can be of unknown size (such as a file taken from the output of a streaming source). A file may be considered as a sequence of input symbols, where each input symbol has a position in the file and a value.

Figure 1:
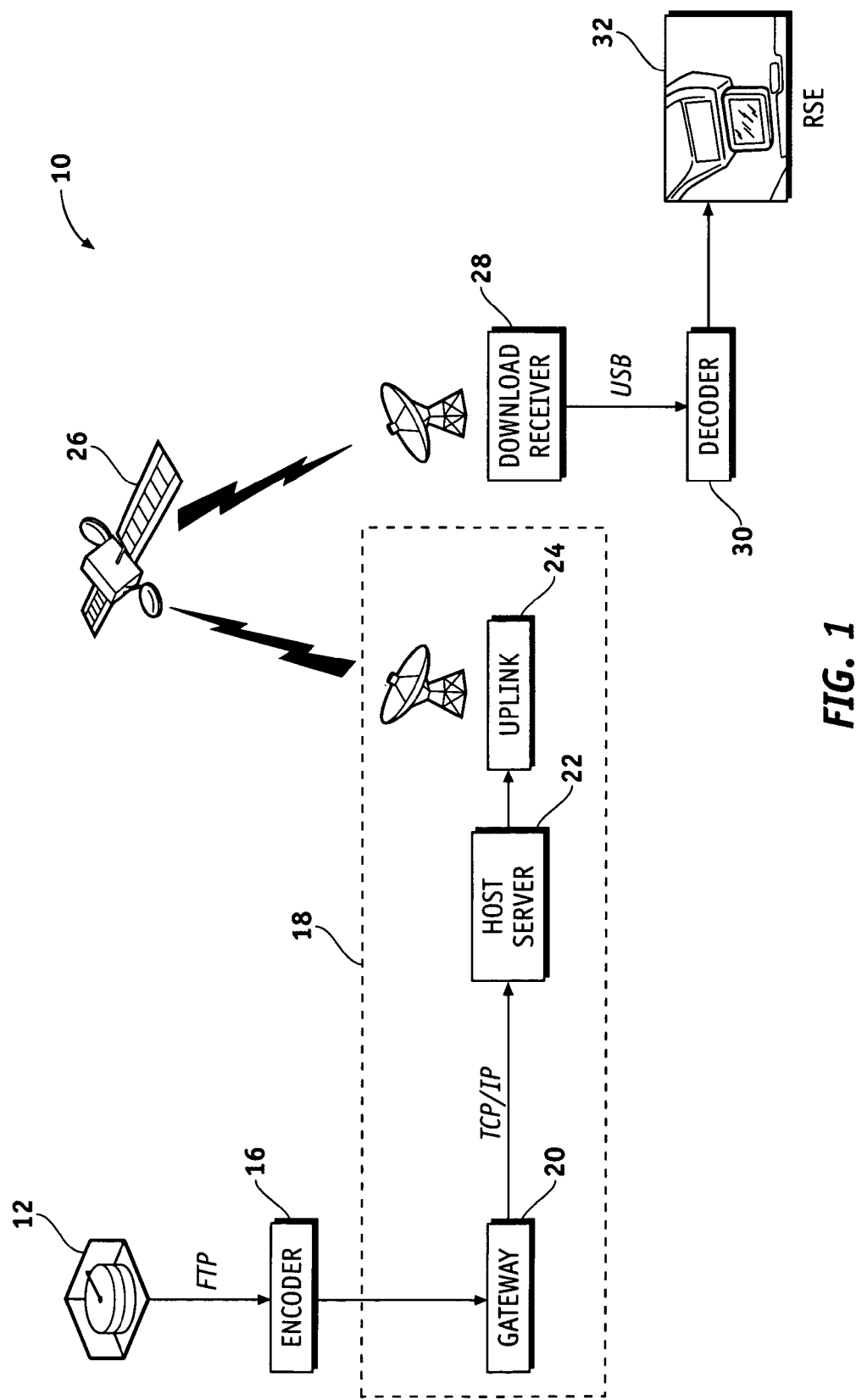
FIG. 1 is a schematic diagram illustrating an exemplary embodiment of a system for wireless broadcast of multimedia to vehicles.

Referring to the drawings, FIG. 1 is a schematic diagram illustrating an exemplary embodiment of a system for wireless broadcast of multimedia to vehicles, shown generally at 10. In this embodiment, the system 10 includes a multimedia data file that may be stored in a conventional storage medium 12, an encoder 16 that accesses the multimedia data file from the storage medium 12 and converts the multimedia data file into groups of encoded data packets, and a wireless transmitter, shown generally at 18, that prepares the encoded data packets for wireless transmission and broadcasts the same from the encoder 16 for a pre-determined broadcast period and at a pre-determined data transmission rate. The broadcast period and data rate may be based on an average vehicle operation duration and/or a probability of occurrence of the average vehicle operation duration. Other data related to vehicle operation, such as may be related to providing a greater percentile of customers with a time period to receive sufficient data packets for reassembling one or more original multimedia files, may also be used to determine the broadcast period and data transmission rate.

It should be appreciated that the blocks of FIG. 1 (as well as the blocks in the other diagrams disclosed herein) can represent functional elements and discrete hardware elements. For example, in one embodiment of the invention, some of the functions or hardware elements illustrated in FIG. 1 may be implemented in a single processor unit. Alternatively, a portion of the functions may be implemented in a single processor unit in combination with hardware elements. The functions can be implemented in hardware, all in software, or a combination of hardware and software can be used.

Each multimedia data file corresponds to a multimedia content. For simplification of explanation, a single multimedia data file is described herein although more than one multimedia data file may be stored in the storage medium 12, broadcasted by the wireless transmitter 18, or otherwise processed by the various components of the invented system 10. Examples of conventional storage medium include, by way of example and not limitation, compact disc (CD), digital video disc (DVD), read-only memory (ROM), programmable ROM types, random access memory (RAM), floppy disk, magnetic tape, flash memory, hard disk, etc. The particular type of storage medium is not critical to the operation of the invented multimedia system so long as the storage medium has sufficient memory size for containing the multimedia file, in whole or in portions thereof.

The encoder 16 provides relatively large multimedia files in the form of groups of data packets, also referred to herein as meta packets, to the transmitter 18 for broadcast. The encoder 16 may access the multimedia files from the storage medium 12 using a conventional data protocol such as file transfer protocol (FTP). In one embodiment, these meta packets are algorithmically generated from the original multimedia file such that the original file may be reassembled upon receipt of a threshold number of meta packets. For example, the meta packets may be coded in an information additive manner where the encoded data generally assists in recovering the original file rather than being duplicative. A receiver of the encoded meta packets may begin reception at any given point of the transmission, and the transmitter 18 is generally not required to stop transmission after a pre-determined number of groups of data packets are generated and transmitted.

The term "transmission" is referred to herein as a process of transmitting data from one or more senders to one or more recipients through a channel in order to deliver a file. At times, data may emanate from more than one sender, or some portion of the transmitted data may be dropped en route to the recipient(s). When transmitting or broadcasting data, data erasure and data incompleteness are two concerns. Data erasure may occur when the channel loses or drops data. Data incompleteness may occur when a recipient does not start receiving data until some of the data has already passed, the recipient stops receiving data before transmission ends, or the recipient intermittently stops and starts receiving data. As an example of data incompleteness, a moving satellite sender may be transmitting data representing an input file and start the transmission before a recipient is in range. Once the recipient is in range, data may be received until the satellite moves out of range, at which point the recipient can redirect a data receiver to start receiving the data about the same input file being transmitted by another satellite that has moved into range. As another example, routers may drop packets when associated buffers are full or nearly full (e.g., congested), and routers may also drop packets for competing packets and/or to enforce rate limitations.

The encoding/decoding scheme used with the invented multimedia system generally minimizes the effects of data erasure and data incompleteness. In one embodiment, a recipient may receive data generated by multiple senders or by one sender using multiple connections. For example, to generally shorten a download time, a recipient may simultaneously connect to more than one sender for transmitting data related to the same file. As another example, in a multicast transmission, multiple multicast data streams may be transmitted to assist recipients with connecting to one or more of these streams such as by matching an aggregate transmission rate with a bandwidth of a channel connecting the sender with the recipients. The particular standard of wireless transmission is not critical to the invention so long as an original multimedia data file is converted to a group of encoded data packets that may be reassembled upon receipt of a threshold number of encoded data packets. Examples of wireless transmission standards include but are not limited to IEEE 802.11 series standards, Bluetooth, HiperLAN1, and HiperLAN2.

The channel may be a real-time channel with the channel moving data from the sender to the recipient as the channel receives the data, or the channel may be a storage channel that stores some or all of the data in transit from the sender to the recipient. An example of the latter is disk storage or other storage device. In this example, a program or device that generates data may be thought of as the sender that transmits the data to a storage device, and the recipient may be the program or device that reads the data from the storage device. In one embodiment, the mechanisms that the sender uses to load the data onto the storage device, the storage device itself, and the mechanisms that the recipient uses to retrieve the data from the storage device may collectively form the channel.

The term "encoder" is referred to herein as a circuit, device, module or code segment that generates data from an input file that assists with recovery of data erasures. In one embodiment, the encoder 16 generates groups of output symbols from input symbols, where a sequence of input symbol values represents a corresponding input file. Each input symbol has a position in the input file and a value associated therewith. A variety of other encoding schemes may be used with the encoder 16 that allow reassembly of the original file upon receipt of a threshold number of data packets and are not limited to initiating reception at a particular point of the transmission.

Transmitting a file generally involves generating, forming, or extracting input symbols from an input file, encoding those input symbols into one or more groups of output symbols, where each group of output symbols is generated based on an associated key independently of all other groups of output symbols, and transmitting the groups of output symbols to one or more recipients over a channel. In one embodiment, meta packets are obtained from an original multimedia file on the storage medium 12 by the encoder 16 and encoded into one or more groups of encoded meta packets for transmission. In this embodiment, each group of meta packets is generated based on an associated key. The encoded meta packets may contain the multimedia content in a digitally compressed format (e.g., sound, images, and video). In one embodiment, a descriptive element having additional information about the compressed multimedia contents is included with the encoded meta packets in a file header used for broadcast. The descriptive element may include information not normally encoded with compressed multimedia contents including, by way of example and not of limitation, best storage/directory information for the customer, parental control information, relevant vehicle information, and subscription control information.

In one embodiment, the transmitter 18 includes a gateway 20 receiving the groups of meta packets from the encoder 16, a host server 22 coupled to the gateway 20, and an uplink device 24 coupled to the host server 22. This embodiment is exemplary of networked communication systems where the encoded meta packets are routed through one or more components of a network, such as through a gateway and a host server providing wireless transmission services. For example, a content provider may connect to a network via the gateway 20 and transmit encoded meta packets using transfer control protocol/Internet protocol (TCP/IP) to the host server 22 that is connected to the network. The gateway 20 is a processing unit that may be a node on the network controlling access to the network and/or routing of data packets to a desired wireless transmission server, such as the host server 22.

The host server 22 may include memory for storing the encoded meta packets for transmission. The host server may be connected to any number and variety of uplink devices, such as a satellite dish, that upload the encoded meta packets for wireless transmission or broadcast. The uplink device 24 and/or host server 22 may include known components, such as a modulation/coding unit, for accomplishing modulation or multiplexing, depending on a particular signal processing mode, as will be appreciated by those of skill in art. For example, the uplink device 24 may include a radio transmitter that modulates the encoded meta packets for wireless broadcast. Although this embodiment of the system 10 is described with respect to a networked transmitter, the wireless broadcast or transmission aspect of the invented system may also have partially or non-networked transmitters or transmission systems. For example, the encoder 16 may be directly connected to the host server 22 or to the uplink device 24.

The system 10 may further include a transponder 26, such as a satellite or signal repeater/relay, receiving the transmitted group(s) of encoded meta packets from the uplink device 24, a downlink receiver 28 that receives the group(s) of encoded meta packets from the transponder 26, a decoder 30 coupled to the downlink receiver 28 that reassembles the original multimedia file from the encoded meta packets, and a multimedia playback device 32 coupled to the downlink receiver 28 having operational software that reads and plays the original multimedia data file. The playback device 32 may include, by way of example and not of limitation, a rear seat entertainment (RSE) device such as a video display mounted in the back of a front seat headrest for viewing by passengers. The received encoded meta packets and/or the reassembled multimedia file may be stored in memory associated with the decoder 30, the playback device 32, a mass storage device associated with such components, or a stand-alone mass storage device, as described in greater detail hereinbelow.

In this embodiment, the downlink receiver 28, decoder 30, and playback device 32 are located on a vehicle. Although the present invention is described in the context of receiving large multimedia data files in a vehicle application, the downlink receiver 28, decoder 30, and playback device 32 may be located on a variety of other personal transportation or as a stand-alone portable device. In this embodiment, the downlink receiver 28 may be connected to the decoder 30 via a universal serial bus (USB) or other conventional communication line.

The downlink receiver 28 includes conventional signal demodulation and/or de-multiplexing components for extracting the encoded meta packets from the wireless transmission signal. Activation of the downlink receiver 28 is generally coordinated with the operation of the vehicle. For example, the downlink receiver 28 may initiate and conduct reception of the encoded meta packets whenever the vehicle is operating, such as with the engine running or whenever battery power is supplied to various vehicle components. Receiving and reconstructing a copy of the input file, i.e., the original multimedia file, includes receiving a set or subset of groups of output symbols (i.e., meta packets) from one of more data transmission streams, and decoding the input symbols from the values and keys of the received groups of output symbols.

After the encoded meta packets are extracted from the wireless transmission signal, the downlink receiver 28 transmits the encoded meta packets to the decoder 30, and the decoder 30 decodes and reassembles the original multimedia file for playback. The term "decoder" is referred to herein as a circuit, device, module or code segment that reconstructs the input symbols from the groups of output symbols received by the recipient. In one embodiment, the decoder 30 is configured to recover input symbols from the values of one or more groups of output symbols (i.e., encoded meta packets) and possibly from information about the values of other input symbols that may have previously been recovered. The decoder recovers some input symbols from some groups of output symbols, which in turn allows the decoder to decode other input symbols from those decoded input symbols and previously received groups of output symbols, and so on, thus causing a "chain reaction" recovery of input symbols of the original multimedia file being reconstructed at the recipient. In one embodiment using software for decoding, such decoding software may be updated using the broadcasting system 10 but identified as operational software elements using the aforementioned descriptive element in the broadcast.

Downloads may not need to be scheduled or coherent using this encoding/decoding scheme which is ideally suited for video-on-demand multimedia as well as receiving and reassembling other multimedia files. For example, the encoding/decoding of the invented system allows a video to be broadcast as a continuous stream on a channel without coordination between the receiver 28 and the transmitter 18. The receiver 28 may simply tune into a broadcast channel for a video of interest and capture sufficient data to reconstruct the original video without having to determine when the transmission started or how to get copies of lost portions of the broadcast. In one embodiment, once the receiver 28 receives a threshold number of encoded meta packets, the decoder may recover a sufficient number of input symbols from the values of one or more groups of output symbols (i.e., encoded meta packets), and possibly from information about the values of other input symbols, to reconstruct or reassemble the original multimedia file.

As previously mentioned, the transmitter 18 may transmit the groups of encoded meta packets for a predetermined broadcast period based on an average vehicle operation duration and/or a probability of occurrence of the average vehicle operation duration. For example, the broadcast period may be selected such that the downlink receiver 28 is more likely to receive the aforementioned threshold number of encoded meta packets, for reconstruction of the original multimedia file, during a minimum time period of downlink receiver operation. In one embodiment, this broadcast period is within a range of time that substantially maximizes efficient use of transmission resources while meeting the threshold number of encoded meta packets. Based on the average vehicle operation duration and a selected data transmission rate, a probability of the downlink receiver 28 being activated for a duration sufficient to receive the threshold number of encoded meta packets may be determined and used to select the broadcast period. For example, the broadcast period may be determined such that a high percentage (e.g., 99%) of customers will be operating their respective vehicles for a duration sufficient to receive the broadcasted group of encoded meta packets during such broadcast period. In one embodiment, the vehicles may acknowledge receipt of the group(s) of encoded meta packets by transmitting a confirmed received signal.

Although the downlink receiver 28 is typically activated during vehicle operation, this duration may vary from operator to operator. Based on the average vehicle operation duration and/or probability of occurrence of this duration, the data transmission rate may be selected such that downlink receiver 28 operation has a greater probability of receiving the threshold number of meta packets for one or more different multimedia files. The average vehicle operation duration and probability of occurrence of this duration may be determined through conventional sampling methods of a desired population. Characteristics of the population may be selected from any number of criteria such as geographic region, vehicle type, customer profile, or any other demographics. In one embodiment, to generally increase the likelihood that a higher percentile of customers or vehicle operators will be operating their respective vehicles for a time period sufficient to receive enough meta packets, for reassembling one or more original multimedia files, different multimedia content may be concurrently transmitted at different data rates within a channel having a transmission bandwidth.

Figure 2:
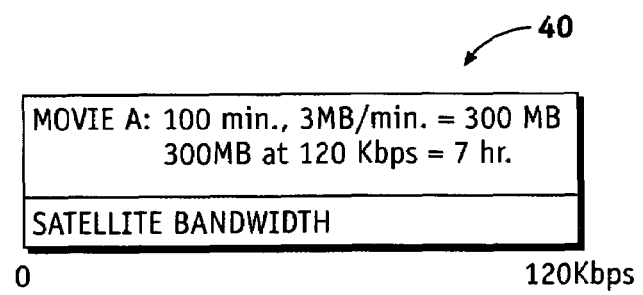
FIG. 2 is a diagram of a first exemplary embodiment of a transmission bandwidth.

FIG. 2 is a diagram of a first exemplary embodiment of a transmission bandwidth, shown generally at 40. A 120 kilobytes per second (kbps) allocation is provided for the transmission bandwidth 42. In this embodiment, all 120 kbps are used to broadcast a multimedia content, movie A, having a length of about 100 min. For a data transmission rate of about 3 MB per min., the movie A has about 300 MB of data, and about 7 hours of vehicle operation is required to receive the threshold number of encoded meta packets for reassembling the original multimedia content.

Figure 3:
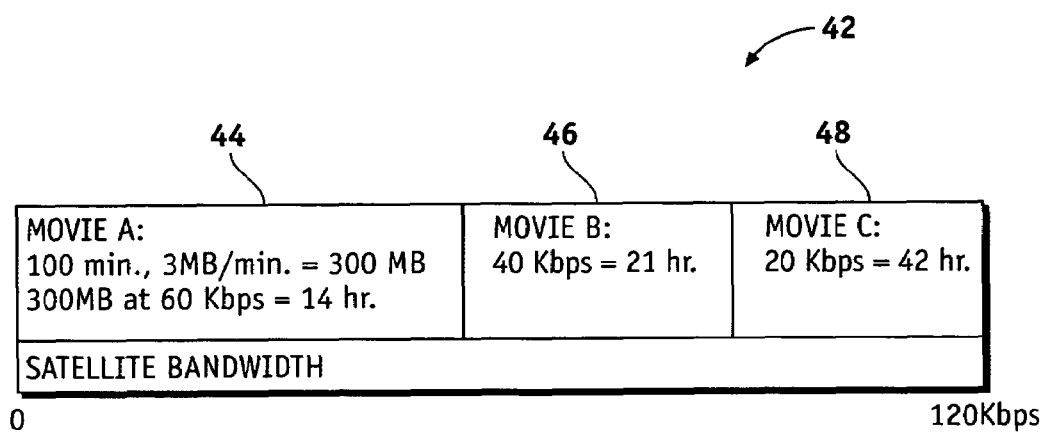
FIG. 3 is a diagram of a second exemplary embodiment of a transmission bandwidth.

FIG. 3 is a diagram of a second exemplary embodiment of a transmission bandwidth, shown generally at 42. A 120 kbps allocation is also provided for the transmission bandwidth 42. In this embodiment, the bandwidth 42 is divided among three different movies that are concurrently broadcasted, namely movie A, movie B, and movie C. Each of the movies has substantially the same duration about 100 min. Movie A is transmitted over a 60 kbps portion 44, movie B is transmitted over a 40 kbps portion 46, and movie C is transmitted over a 20 kbps portion 48. For a data transmission rate of about 3 MB per min., about 14 hours of vehicle operation is required to receive the threshold number of encoded meta packets to reassemble the original multimedia content of movie A, about 21 hours of vehicle operation is required to receive the threshold number of encoded meta packets to reassemble the original multimedia content of movie B, and about 42 hours of vehicle operation is required to receive the threshold number of encoded meta packets to reassemble the original multimedia content of movie C. In this embodiment, customers or vehicle operators that spend more time operating their vehicles generally receive more multimedia content. For example, customers who spend more time operating their vehicle may receive enough meta packets to reassemble movie B and movie A, and customers who spend an even more time in their vehicle may receive enough meta packets to reassemble movie A, movie B, and movie C. The data rate may be selected based on the number of concurrent multimedia transmissions and the available transmission bandwidth.

One example of multimedia content provided by the invented system 10 (FIG. 1) is a video-on-demand service for vehicles. In one embodiment, the video-on-demand service may be offered on a subscription basis to the customer. To facilitate conditional access to the multimedia contents of the service, access to the multimedia files stored on the decoder 30 (FIG. 1), playback device 32 (FIG. 1), or mass storage device may be controlled using the operational software of the playback device 32 (FIG. 1). For example, the stored multimedia files may be encrypted to limit accessibility in the event the multimedia files on the mass storage device are accessed using a device other than the playback device 32 (FIG. 1). Activation and deactivation of the playback device 32 (FIG. 1) may be accomplished by transmitting unique vehicle specific subscription control files using the descriptive element of the file header information or using an alternative communication channel. New groups of encoded meta packets, corresponding to new multimedia content, may be received and stored on the decoder 30 (FIG. 1) or playback device 32 (FIG. 1) irrespective of the subscription status.

Figure 4:
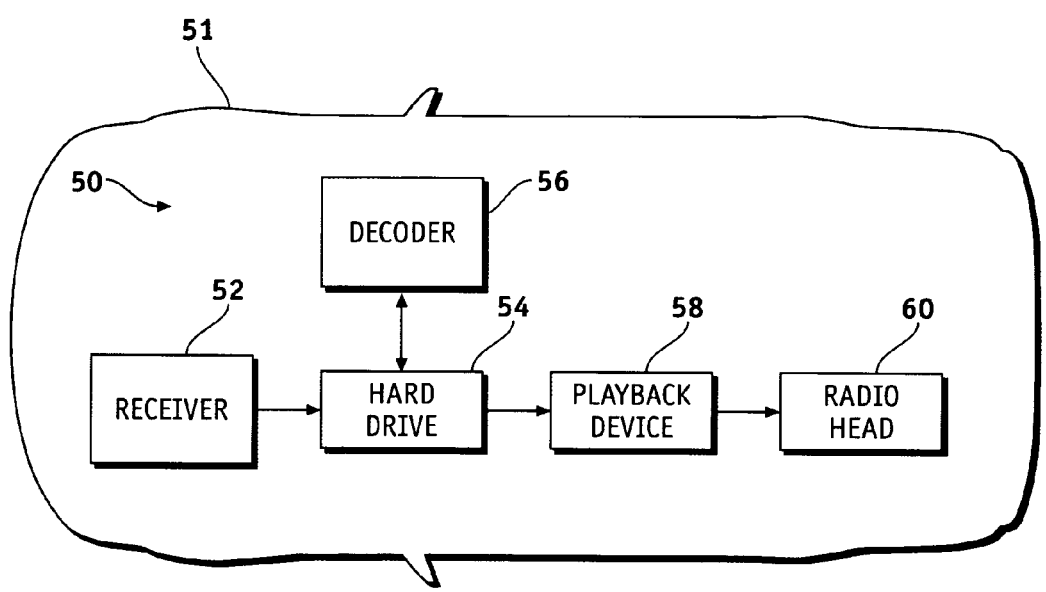
FIG. 4 is a block diagram showing an exemplary embodiment of a multimedia system for a vehicle.

FIG. 4 is a block diagram showing an exemplary embodiment of a multimedia system, shown generally at 50, for a vehicle, shown generally at 51. The system 50 includes a vehicle-based receiver 52 configured to wirelessly receive one or more groups of encoded meta packets at a corresponding data rate from a wireless broadcast, such as from the transmitter 18 (FIG. 1), a mass storage device 54 coupled to the receiver, a decoder 56 coupled to the mass storage device 54 that accesses the storage device 54 and reassembles the original multimedia file, a playback device 58 coupled to the mass storage device 54 that generates audio/video signals associated with the playback of the multimedia file, and a multimedia output device 60 that reproduces and displays the multimedia content.

In this embodiment, delivery of multimedia files may be used for video-on-demand services with a rear seat entertainment system of the vehicle 51. When the vehicle is operating, the system 50 continuously receives new meta packets and assembles the original video files when the threshold number of encoded meta packets are received by the receiver 52. In one embodiment, the mass storage device 54 is a hard drive that contains the received encoded meta packets. Other types of large memory writable/re-writable devices may also be used for the mass storage device 54 such as magnetic tape and flash memory. The particular type of storage medium is not critical to the operation of the invented multimedia system so long as the storage medium has sufficient memory size for containing multimedia files, in whole or in portions thereof. The mass storage device 54 may be partitioned such that memory is allocated and available for all meta packets that may be required for reassembly of files being broadcasted. In one embodiment, meta packets of multimedia files that are no longer transmitted and that were not assembled/reassembled may be deleted to increase available memory.

The decoder 56 retrieves groups of encoded meta packets received by the receiver 52 and stored on the mass storage device 54 after the threshold number of encoded meta packets are received for reassembling the original multimedia content. The threshold number is not reliant on any particular order of the encoded meta packets. Decoding is then conducted by the decoder 56 to obtain multimedia data files corresponding to the original multimedia content which are assembled to form the original multimedia content for playback.

Assembled multimedia files may be made available to the customer for viewing. Because the continuous in-flow of new multimedia files consumes memory, the storage capacity of the mass storage device 54 may be exceeded. Older files stored in the mass storage device 54 may be deleted and replaced with new content to minimize this occurrence. In one embodiment, the customer may "lock" selected files to prevent replacement of such files by new files.

The playback device 58 may further conduct decoding of the multimedia files to produce audio and video output signals for input to the multimedia output device 60. For example, the multimedia files may contain audio encoding for different audio effects such as surround sound. Additionally, the assembled multimedia files may be encrypted such that an appropriate playback device 58, having operational software for decrypting the assembled media files, may access the multimedia files and play the same. This encryption/decryption matching of the assembled multimedia files and the playback device 58 is useful limiting access to the broadcasted multimedia files to customers partaking in a corresponding multimedia subscription service and using "authorized" playback devices. The multimedia output device 60 may include conventional audio speakers and video displays.

Figure 5:
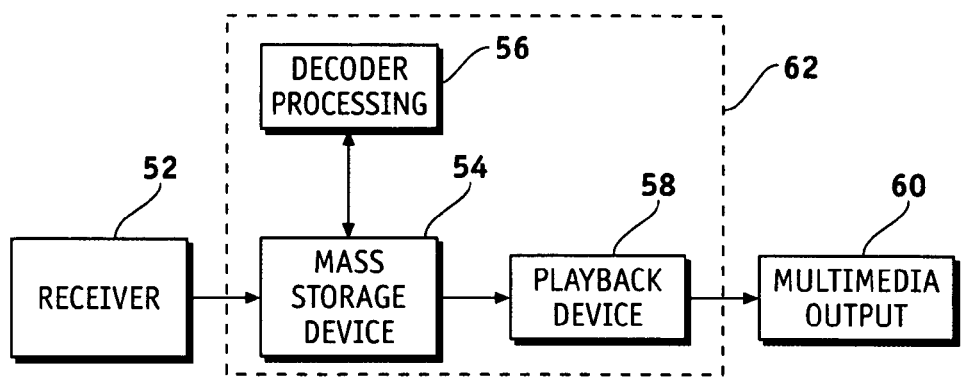
FIG. 5 is a block diagram of a second exemplary embodiment of a multimedia system for a vehicle.

FIG. 5 is a block diagram of a second exemplary embodiment of a multimedia system for a vehicle. In this embodiment, the mass storage device 54, decoder 56, and playback device 58 are combined into one physical module 62. One advantage of this embodiment is that the mass storage device 54 may be used for other purposes in the playback device 58 without data connection between the playback device 58 and the mass storage device 58. Other advantages of this embodiment include availability of the mass storage device 54 for storing compressed audio content from CDs when the playback device 58 is a CD R/W (e.g., MP3 ripping) or for storing digital map data from CDs when the playback device 58 is an electronic navigation aid.

Figure 6:
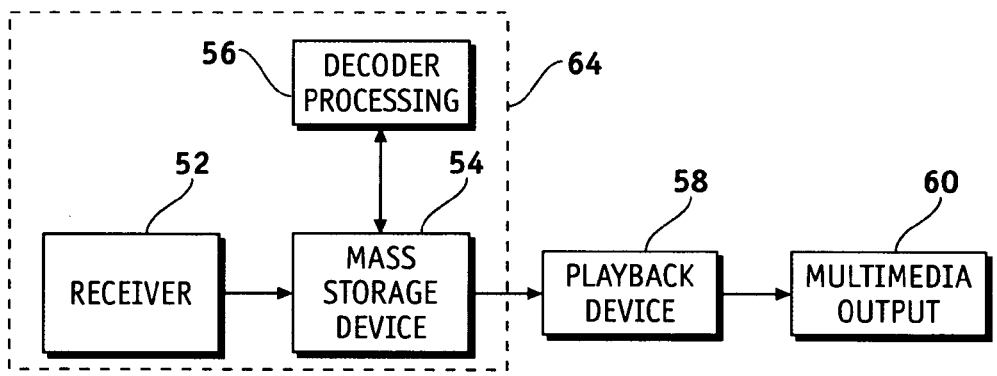
FIG. 6 is a block diagram of a third exemplary embodiment of a multimedia system for a vehicle.

FIG. 6 is a block diagram of a third exemplary embodiment of a multimedia system for a vehicle. In this embodiment, the receiver 52, mass storage device 54, and decoder 56 are combined into one physical module 64. This module 64 is particular suited to use existing audio and video inputs associated with a pre-existing playback device 58 in the vehicle 51. For example, minimal structural changes may be required by the addition of the module 64 to an existing infotainment system because the module may be simply coupled with the infotainment system using associated audio/video inputs. Additionally, this module 64 may easily be used across different vehicles and may assist in part reuse.

Figure 7:
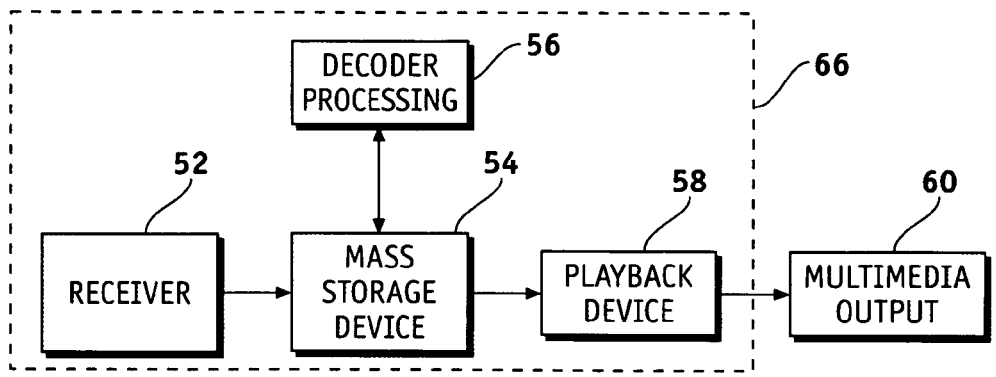
FIG. 7 is a block diagram of a fourth exemplary embodiment of a multimedia system for a vehicle.

FIG. 7 is a block diagram of a fourth exemplary embodiment of a multimedia system for a vehicle. In this embodiment, the receiver 52, mass storage device 54, decoder 56, and playback device 58 are all combined into one physical module 66. This module 66 may minimize overhead costs commonly associated with each separate component, such as separate power supplies and serial data interfaces.

Figure 8:
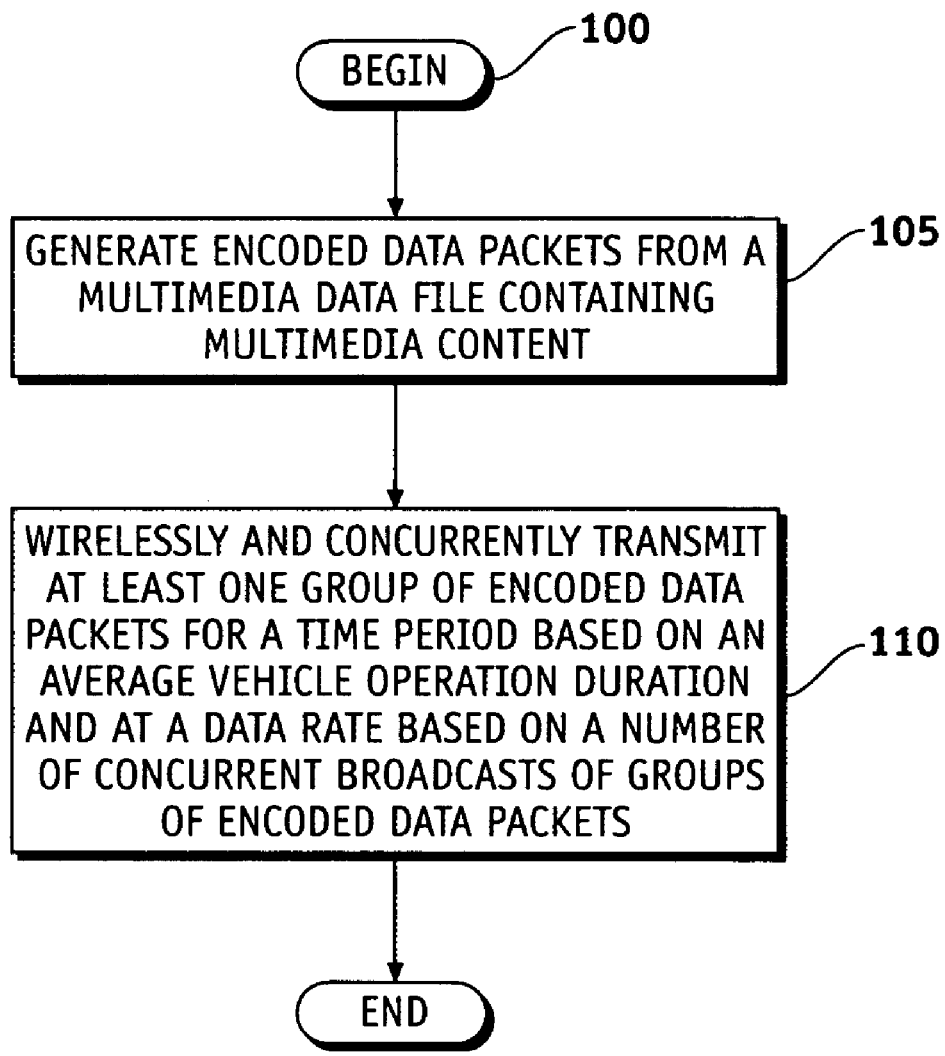
FIG. 8 is a flow chart of an exemplary method of broadcasting multimedia files to vehicles.

FIG. 8 is a flow chart of an exemplary method of broadcasting multimedia files to vehicles. The method begins at step 100. A group of encoded data packets representing at least a portion of a multimedia content are generated at step 105 by the encoder 16 (FIG. 1). For each different multimedia content, such as different movies, a separate group of encoded data packets are generated by the encoder 16 (FIG. 1).

The group of encoded data packets are wirelessly transmitted at step 110 by the transmitter 18 for a time period based on the average vehicle operation duration and at a data rate based on a number of concurrent broadcasts of groups of data packets. In one embodiment, it may be desirable to broadcast multiple different multimedia data files. In this embodiment, each group of data packets corresponding to a desired multimedia data file is assigned a data rate which may be determined by the number of different multimedia data files desired to be concurrently broadcasted and the available transmission bandwidth, as previously indicated with respect to the embodiment shown in FIG. 3. When a threshold number of encoded data packets are received by the receiver 28 (FIG. 1) for a particular group of encoded data packets associated with a corresponding multimedia data file, reassembly of the corresponding multimedia data file may begin. In one embodiment, the threshold number of received encoded data packets is not based on the order or receipt of the relevant encoded data packets.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for broadcasting multimedia files to vehicles, said system comprising:

an encoder configured to convert a multimedia file to a group of encoded data packets; and a wireless transmitter coupled to said encoder, said transmitter configured to receive said group of encoded data packets from said encoder and concurrently broadcast at least one group of encoded data packets for a pre-determined time period and at a pre-determined data rate, each of said at least one group of encoded data packets corresponding to a different multimedia file, said time period based on an average vehicle operation duration, said data rate based on a broadcast bandwidth and a number of concurrently broadcasted groups of encoded data packets.

2. A system according to claim 1, wherein said transmitter is configured to concurrently broadcast a first group of encoded data packets at a first data rate and a second group of encoded data packets at a second data rate, said first data rate different from said second data rate.

3. A system according to claim 1 further comprising a network coupling said encoder with said wireless transmitter, said network comprising:
- a gateway coupled to said encoder, said gateway configured to receive said group of encoded data packets from said encoder via a file transfer protocol; and
- a multimedia server coupled with said gateway, said multimedia server configured to select at least one group of encoded data packets for concurrent broadcast by said wireless transmitter.

4. A system according to claim 3, wherein said transmitter comprises an uplink device coupled to said multimedia server, said uplink device configured to convert said group of encoded data packets to a transmission signal.

5. A system according to claim 1, wherein each of said at least one group of encoded data packets comprises:
- a digitally compressed multimedia content; and
- a descriptive element having additional information of said multimedia content.

6. A multimedia system for a vehicle, said system comprising:
- a vehicle-based receiver configured to wirelessly receive at least one group of encoded multimedia data packets during activation of the vehicle, said at least one group of encoded multimedia data packets broadcasted at a pre-determined data rate for a pre-determined time period, each of said at least one group of encoded multimedia data packets corresponding to a different multimedia data file, said data rate based on a broadcast bandwidth and a number of concurrently broadcasted groups of encoded data packets, said time period based on an average vehicle operation duration;
- a data storage device coupled to said receiver, said data storage device configured to store said at least one group of encoded multimedia data packets;
- a decoder coupled to said data storage device, said decoder configured to access said at least one group of encoded multimedia data packets from said data storage device and assemble said different multimedia data file upon receiving a threshold number of encoded multimedia data packets for said at least one group of multimedia data packets, said data storage device configured to store said assembled multimedia data file; and
- a multimedia playback device coupled to said data storage device, said playback device configured to play said assembled multimedia data file.

7. A system according to claim 6, wherein said receiver is configured to concurrently receive a plurality of groups of encoded multimedia data packets, each group of said plurality of groups of encoded multimedia data packets corresponding to a different multimedia content, each group of said plurality of groups of encoded multimedia data packets received at a different data rate during activation of the vehicle.

8. A system according to claim 7, wherein said data storage device is configured to store each group of said plurality of groups of encoded multimedia data packets.

9. A system according to claim 6, wherein said data storage device, said decoder, and said playback device are one module.

10. A system according to claim 6, wherein said receiver, said data storage device, and said decoder are one module.

11. A system according to claim 6 further comprising a multimedia output device coupled to said playback device, said multimedia output device comprising an audio speaker and a video display.

12. A system according to claim 11, wherein said receiver, said data storage device, said playback device, and said decoder are one module.

13. A system according to claim 6, wherein said assembled multimedia data file stored on said data storage device is encrypted for access by said playback device; and wherein said multimedia playback device comprises operational software for decrypting said assembled multimedia data file.

14. A system according to claim 6, wherein said data storage device is configured to remove said stored groups of encoded multimedia data packets and said assembled multimedia data files on a first-in first-out order.

15. A system according to claim 14, wherein said data storage device comprises a selector for preventing removal of a selected assembled multimedia data file.

16. A method of broadcasting multimedia files to vehicles, said method comprising the steps of:
- generating a group of encoded data packets from a multimedia data file containing a multimedia content; and
- wirelessly and concurrently transmitting at least one group of encoded data packets for a time period based on an average vehicle operation duration and at a data rate based on a number of concurrent broadcasts of groups of encoded data packets.

17. A method according to claim 16, wherein said transmitting step comprises:
- wirelessly transmitting a first group of encoded data packets at a first data rate, the first group of encoded data packets corresponding to a first multimedia data file; and
- wirelessly transmitting a second group of encoded data packets at a second data rate, the second group of encoded data packets corresponding to a second multimedia data file, the first data rate different from the second data rate.

18. A method according to claim 17 further comprising the steps of:
- reassembling the first multimedia data file when a first threshold number of encoded data packets are received of the first group of encoded data packets; and
- reassembling the second multimedia data file when a second threshold number of encoded data packets are received of the second group of encoded data packets.

* * * * *